July 15, 1969      G. B. FOSTER ET AL      3,455,149
VIBRATION AMPLITUDE MONITOR
Filed Jan. 20, 1966      2 Sheets-Sheet 1
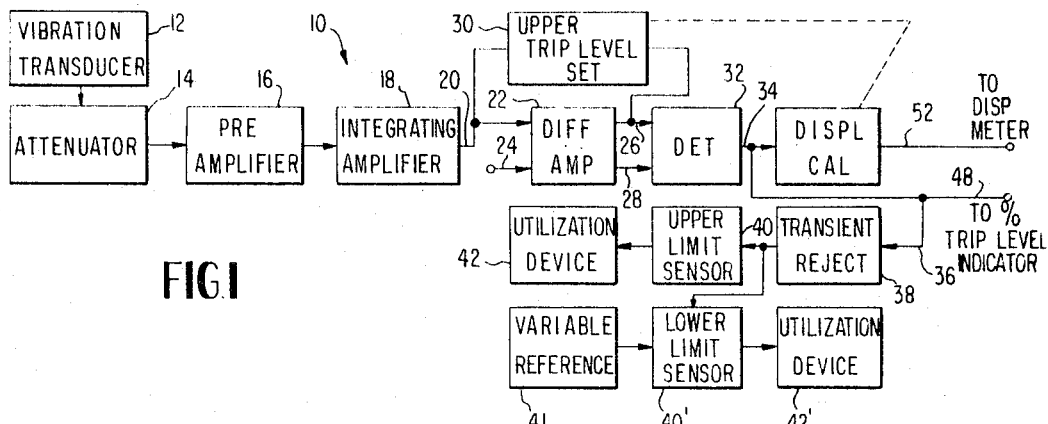
FIG.1
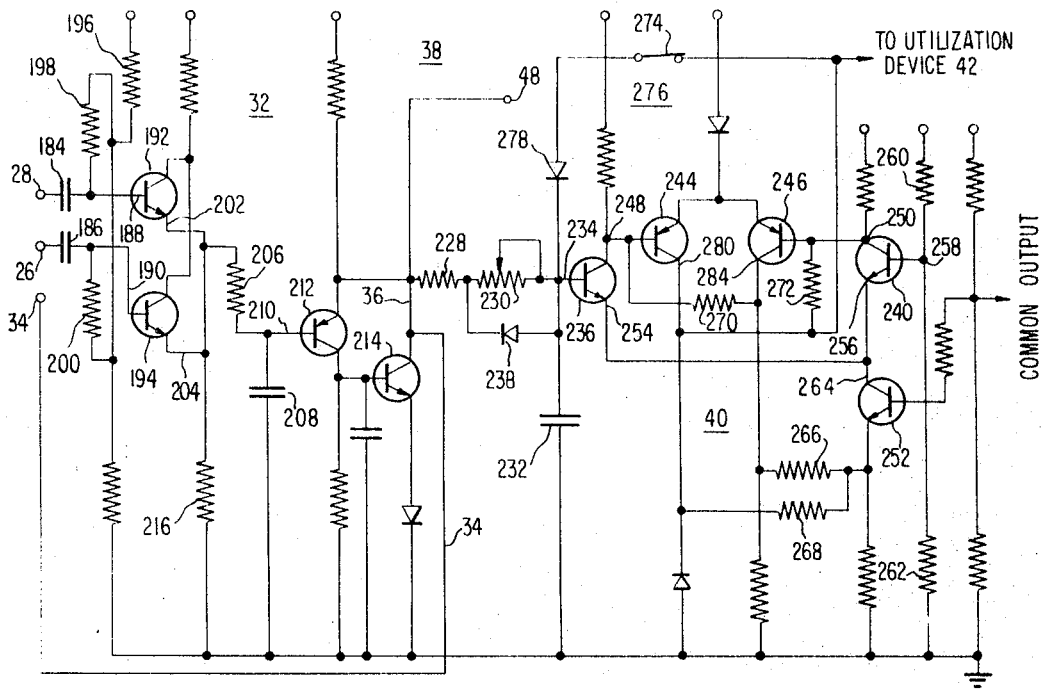
FIG.3
FIG.4
INVENTORS
GEORGE B. FOSTER
KENNETH A. OSTRANDER
BY *LeBlanc & Shur*
ATTORNEYS
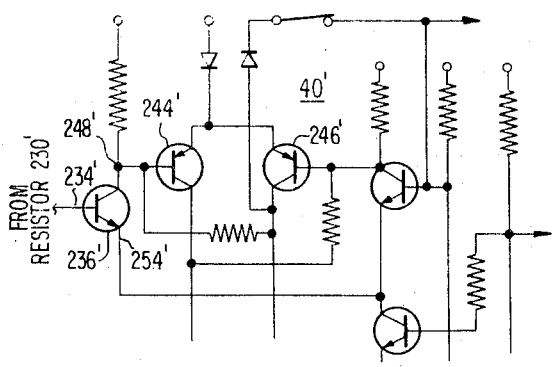

_United States Patent Office_ 3,455,149
Patented July 15, 1969

3,455,149
VIBRATION AMPLITUDE MONITOR
George B. Foster, Worthington, and Kenneth A.
Ostrander, Columbus, Ohio, assignors to Reliance Electric and Engineering Co., Cleveland,
Ohio, a corporation of Ohio
Filed Jan. 20, 1966, Ser. No. 521,861
Int. Cl. G01n 9/18
U.S. Cl. 73—71.4    7 Claims

ABSTRACT OF THE DISCLOSURE

There is disclosed herein vibration monitoring apparatus including a vibration-sensitive transducer, amplifier circuitry, limit sensing circuitry to provide an indication when the measured vibration exceeds a preset trip level, and display circuitry to produce a first output representative of the instantaneous percent of trip level and a second output representative of the amplitude of the vibration being measured. The amplifier circuitry comprises an extremely stable differential amplifier having automatic operating point control and a feedback gain control system for establishing the preset trip level for the limit sensor. The percentage of trip level indication is provided directly by virtue of the gain control for the amplifier circuitry while the actual vibration amplitude indication is provided by a display calibration circuit coupled to the amplifier circuitry and arranged to adjust the amplifier output signal in relation to the gain control setting to convert the percentage of trip level signal into a vibration amplitude analog.

This invention relates to vibration monitoring, and more particularly to apparatus which provides a continuous indication of the displacement of a vibrating structure and includes means to provide accurate and repeatable indications whenever the level of vibration departs from within a preset range.

It is the practice in connection with the use of rotating or reciprocating machines, or other mechanical equipment, to continuously monitor the levels of vibration of such machines during operation. This practice is based on recognition that a vibration level in excess of that normally associated with the particular machine is often an indication of impending failure or malfunction of one or more parts of the mechanism.

Such monitoring is often accomplished by attaching to the machine vibration transducers which measure the acceleration of the part to which the sensor is attached and provide electrical signals proportional or otherwise related thereto. In certain cases, it has been found that considerable improvement may be realized by using a sensor which responds not to the level of acceleration, but rather to the velocity of the vibrating member. The output of the sensor may then be integrated to provide an indication of the vibration level.

For example, in low-speed machinery such as reciprocating engines, wherein amplitudes of vibration of the order of 0.03 inch would typically be an indication of an impending malfunction, it has been found to be impractical to sense the vibration on the basis of the acceleration of the vibrating member. The primary reason for this is that in the typical machine shop, or other industrial sites, there are present low-frequency random vibrations having acceleration levels of the order of 1 G unrelated to the operation of the machine being monitored. Since these vibrations are harmless, the monitoring apparatus should be arranged not to respond to them. Thus, it may be seen that an acceleration pickup for use in such environments should be adapted to sense accelerations of approximately 1 G or greater, and to reject smaller accelerations.

In reality, vibration of 0.03 inch, a typical critical level in a low-frequency machine, is associated with far less than 1 G of acceleration. In fact, for a machine operating at approximately 300 r.p.m., there would be required approximately 0.8 inch of movement to cause an acceleration of the member of the order of 1 G. In other words, a part in a low-frequency machine subjected to approximately 1 G of acceleration would literally tear itself apart before an acceleration sensor could provide a reasonably meaningful indication of the vibration.

On the other hand, the velocity of such random vibration is considerably below that associated with critical vibration amplitudes on the order of 0.03 inch. Velocity sensors therefore, offer an attractive approach to vibration monitoring in low speed machinery. Unfortunately, heretofore available systems utilizing velocity sensors have not provided a satisfactory degree of convenience and operational flexibility. For example, analysis of the long term operating characteristics of the machine being monitored requires that a permanent record be provided of its vibration levels. Presently available equipment is often able to supply such a record. However, in addition to the permanent record, when the vibration reaches a level such that breakdown or failure is imminent, it is necessary to provide an immediate alarm and to stop the machine so that appropriate repairs can be made. Flexibility of the monitoring equipment further requires that the level of vibration at which an alarm will be provided should be variable but repeatable to a high degree of accuracy.

Another deficiency of heretofore available equipment, results from the presence of random vibrations of high velocity and extremely short duration (i.e., high frequency) to which the velocity sensor may respond, but which bear no relationship to machine operation. Therefore, it is desirable that the monitoring system include means by which such short duration transients may be rejected, so as to prevent the recording thereof as a component of the machine vibration, or more significantly, to prevent an unnecessary alarm and shutdown of the machine. Means to accomplish this function has not heretofore been available. To provide flexibility in the use of the equipment, it is desirable that the transient rejection circuitry be adjustable so as to permit the rejection of the wide variety of transient signals, depending on the particular environment in which the equipment is to be used.

Under normal circumstances, a monitoring system such as described above should be arranged so that the vibration level recorded and utilized to provide an alarm indication will be determined by the average value of the machine vibration, i.e., the dominant one of a plurality of modes of vibration present. On the other hand, under certain circumstances it should also be possible to adapt the system for response to the instantaneous peak value of the vibration, with additional selectivity as to rejection of short duration transients.

An additional feature which should advantageously be incorporated into a system such as described above would be means to provide an independent alarm when the level of vibration in the machine falls below a certain predetermined normal operating level, it having been recognized that various machine malfunctions can be readily identified in this matter. A further feature is that a third limit may be incorporated to provide an additional alarm or shutdown of user's equipment.

Furthermore, under many circumstances, it is desirable for the machine operator to be able to tell at a glance whether the vibration of the machine has reached or is approaching a dangerous level. Thus, suitable metering circuitry should be provided whereby an indication is given, preferably in terms of the percentage of a preset alarm level. However, in view of the fact that the equipment should be adaptable to various critical levels of vibration, and must at the same time provide the above or similar functions, has been quite expensive and quite complex, and has not possessed the requisite degree of flexibility whereby adjustment of the equipment to respond to different critical levels of vibration, etc., could be readily accomplished.

Thus, it may be seen there has been no equipment available to adequately meet the requirements outlined above in a commercially satisfactory manner, nor has there been a full understanding or correlation of the various factors which have been discussed.

In contrast, the above-described features are attained in the present invention by combining a magnetic, velocity-sensitive transducer with novel electronic circuitry having sufficient flexibility to meet all of the requirements outlined. In particular, the transducer is connected through an attenuator network, a preamplifier, and an integrator, to a variable sensitivity amplifier system including an extremely stable differential amplifier of novel design, having a variable impedance feedback network connected thereacross. The amplifier system drives a detector circuit which may be adapted to respond either to the dominant one of a plurality of modes of vibration or to the instantaneous peak value thereof. As a result of the particular configuration of the variable sensitivity amplifier system, the detector output is representative at all times of percentages of preset levels of vibration. The detector may then be suitably scaled in synchronism with changes in the sensitivity of the associated amplifier to provide a continuous calibrated analog output representative of the absolute value of either the instantaneous or average value of the vibration. The unscaled percentage signal is provided to a pair of limit detectors which respond to predetermined signal levels to generate alarm indications. In addition, the level-sensing circuitry includes variable rise-time input circuitry so as to prevent response thereof to signals of less than an adjustable predetermined duration.

Accordingly, it is a general object of the present invention to provide improved apparatus to protect machines from excessive vibration.

More specifically, it is an object of this invention to provide velocity responsive apparatus giving a continuous indication of the level of vibration, and actuating an alarm signal when the vibration exceeds a predetermined variable level.

It is a further object of this invention to provide monitoring equipment which will actuate an alarm when the vibration falls below a predetermined level.

It is a further object of this invention to provide a vibration sensor of the type described which responds either to the dominant one of a plurality of modes of vibration or, alternatively, to the instantaneous peak value of the vibration.

It is also an object of this invention to provide a vibration monitor of either the peak or dominant mode responsive type which may be made selectively responsive only to vibration of greater than a predetermined duration. It is a related object of this invention to provide a vibration sensor which will accurately and repeatedly provide an indication when the sensed vibration departs from between two predetermined limits.

It is also an object of this invention to provide a monitoring system including a velocity-sensitive detector and a variable sensitivity amplifier system incorporating a feedback differential amplifier of novel and improved design.

It is a further object of this invention to provide a vibration monitor described above including a variable sensitivity differential amplifier and a full-wave detector circuit to provide an output signal representative of the percentage of the maximum acceptable value attained by the vibration being measured.

It is a further object of this invention to provide a vibration monitor as described above including variable calibration circuitry synchronized with the differential amplifier sensitivity control to provide a concurrent output signal representative of the absolute value of the vibration of the machine being monitored.

The exact nature of this invention, as well as other objects and advantages thereof, will be readily apparent from consideration of the following detailed description and the accompanying drawings in which:

FIGURE 1 is a block diagram of the functional components of the vibration monitor of the present invention;

FIGURE 3 is a detailed circuit diagram of the detector, the transient rejection circuit, and one of the limit sensors shown in FIGURE 1; and FIGURE 4 shows a circuit diagram of a portion of the other limit sensor shown in FIGURE 1.

Figure 2:
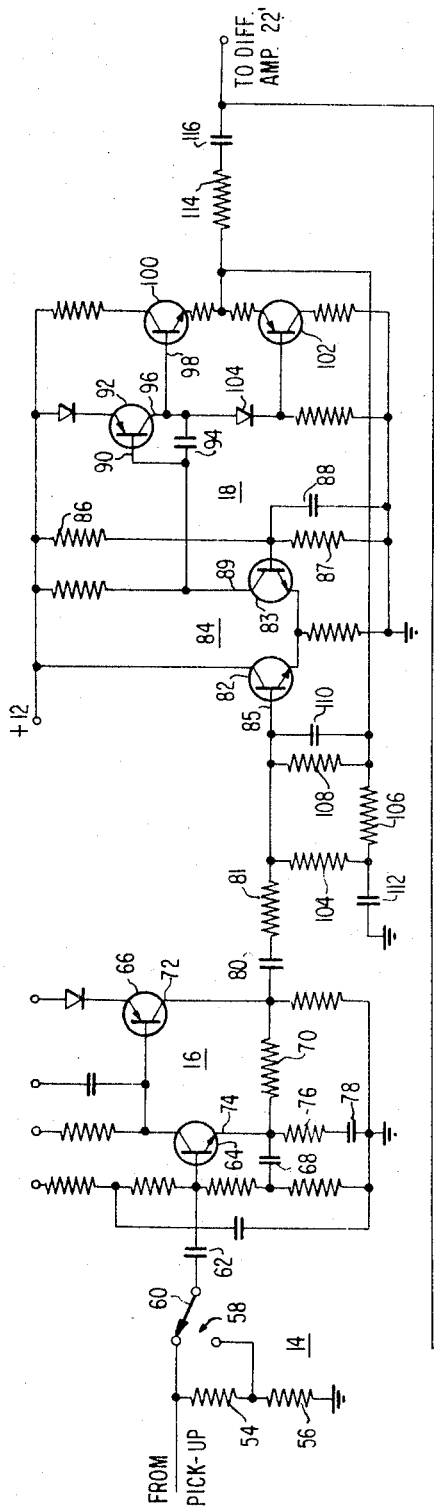
FIGURE 2 is a detailed circuit diagram of the attenuator, preamplifier, integrating amplifier, differential amplifier, and displacement calibration unit shown in FIGURE 1.
Figure 2:
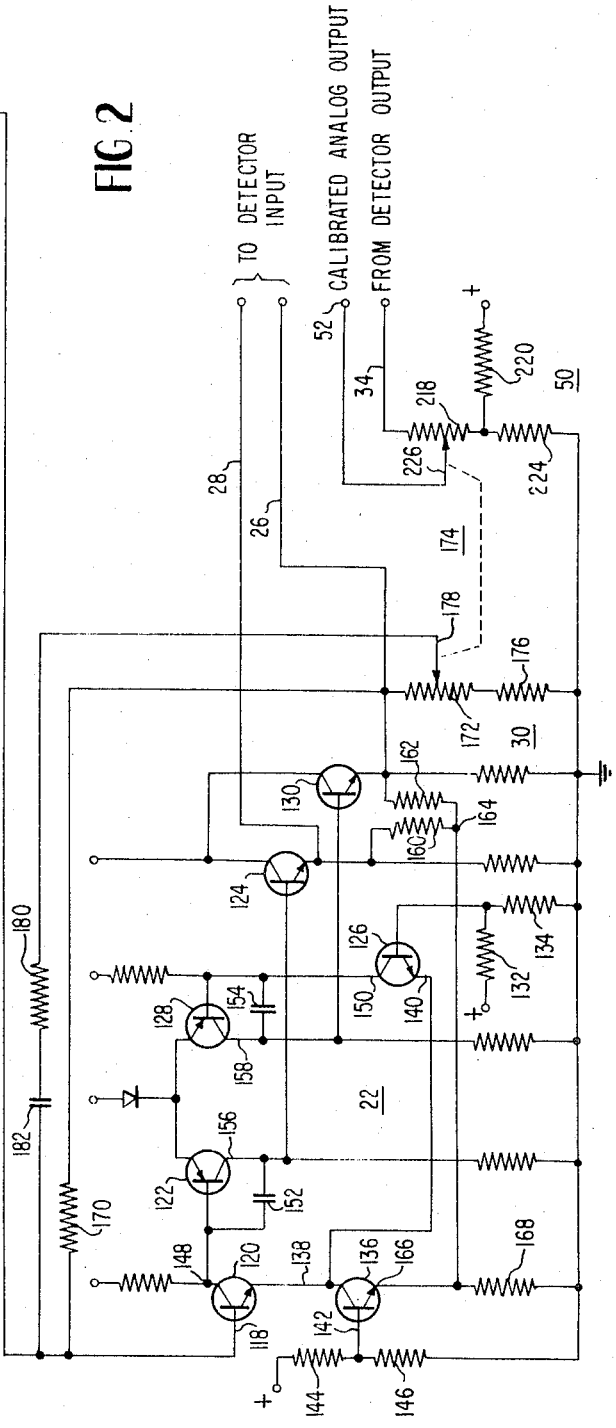

Referring now to FIGURE 1, the monitoring system of the present invention, generally denoted at 10, comprises a vibration pickup or transducer 12 connected through a variable attenuator 14 and a preamplifier 16 to an integrating amplifier 18. Vibration transducer 12 is of the moving magnet type, whereby in response to vibration of the machine, a voltage is generated which is directly proportional to the instantaneous velocity of the vibration being sensed. The transducer output is passed through attenuator 14 which serves to permit the operation of the vibration monitor 10 over a wide range of signal levels.

Attenuator 14 drives a high input impedance voltage preamplifier 16, the output of which is fed to integrating amplifier 18 which integrates the amplified pickup signal, thereby providing information representative of the actual displacement, rather than the velocity, of the vibrating machine.

Integrating amplifier 18 is connected by lead 20 as a first input to differential amplifier 22, to which a second input is provided over lead 24 from an appropriate reference voltage source. The reference level provided on lead 24, and the dynamic characteristics of differential amplifier 22 are chosen so that the amplifier outputs on leads 26 and 28 are of equal amplitude and exactly 180 degrees out of phase with respect to each other. A feedback circuit 30 is connected across differential amplifier 22 and serves as a gain control circuit whereby a given vibration level sensed by transducer 12 produces a signal of accurately controllable amplitude on leads 26 and 28.

The outputs of differential amplifier 22 are provided over leads 26 and 28 to a full-wave detector circuit 32 to provide a time varying DC signal on lead 34 which is selectively representative of the amplitude of the dominant signal frequency appearing at the input or of the input signal. In other words, full-wave detector 32 may be adjusted to operate either as a peak detector, or as an average detector.

The use of a differential amplifier and a full-wave detector rather than a single-ended amplifier and a half-wave detector is preferred since in this way it is possible to obtain at the output of the detector a more smooth and ripple-free signal, than would otherwise be obtainable.

Detector 32 is connected by lead 36 to the input of transient rejection circuit 38 which provides an adjustable rise-time input for an upper limit sensor 40. The transient rejection circuit may be adjusted over a wide range to prevent operation of the limit sensor by short duration high level transients which have no significant effect on the short term operation of the machine.

Limit sensor 40 is in essence a bistable device adjusted to trigger at an extremely accurately controllable threshold. The circuit is preferably arranged so that once the threshold is exceeded, the device will remain in its set state, or alternatively, it may be arranged to return to its initial state in the manner of a trigger circuit once the input falls below the predetermined threshold.

In either event, the output of limit sensor 40 is connected to a utilization device 42 which may be a relay coil or the like. Utilization device 42 may be used to initiate an alarm, as by closing a set of contacts, and/or to cause the machine being monitored to be shut down.

In order to provide an indication when the vibration level of the machine being monitored falls below a given level, vibration monitor 10 preferably includes a second channel including a limit sensor 40' and a utilization device 42'. In order to provide a continuous indication (until reset) of the fact that the vibration level has fallen below a predetermined level, lower limit sensor 40' is preferably adapted for latching in the state thereof corresponding to inputs below the threshold level, which state may be used to activate the utilization device 42'. For example, as long as the output of the transient rejection circuit 38 is above a certain level, limit sensor 40' will maintain utilization device 42' operated, whereby an alarm indication is not given. Similarly, as long as the output of transient rejection circuitry 38 is below another predetermined level, upper limit sensor 40 will maintain utilization device 42 in its inoperative condition, also preventing the alarm output. As in the case of utilization device 42, appropriate relay contacts in utilization device 42' may be adapted to shut down the machine if an extremely low vibration level is detected.

As previously noted, the output of detector 32 is directly proportional to percentages of the preset alarm levels as a result of the sensitivity control imparted by feedback circuit 30. In particular, the signal provided over leads 34 and 36 is representative of the percentage of the level which will fire upper limit sensor 40. This signal may be provided over lead 48 to a suitable meter calibrated in percentage whereby the vibration level in terms of a percent of a maximum allowable level may be quickly determined even by an unskilled operator.

The signal on lead 34 is also provided to a displacement calibration circuit 50 which is mechanically synchronized with the adjustment for feedback circuit 30 to provide an output on lead 52 which is a direct analog of the vibration level itself. No similar circuit is needed with feedback circuit 30' since it would provide no information not already available.

Referring now to FIGURES 2 through 4, there is shown in detail the circuitry depicted in FIGURE 1. In FIGURE 2 are shown attenuator 14, preamplifier 16, integrating amplifier 18, differential amplifier 22, feedback circuit 30, and displacement calibration circuit 50.

Attenuator 14 is comprised of a simple voltage divider including resistors 54 and 56, and a switch 58. Resistors 54 and 56 are selected in accordance with the range of sensitivities desired. For example, the total resistance may be arranged to be ten times that of resistor 56 alone so that switch 58 provides an attenuation factor of 10 in the position shown. Of course, additional switch positions and resistors may be provided if more than one degree of attenuation is necessary.

Arm 60 of switch 58 is connected through capacitor 62 to the input of a high input impedance preamplifier 16. The preamplifier is comprised of a pair of transistors 64 and 66, and associated biasing circuitry, and a bootstrap capacitor 68 which serves to provide high input impedance for transistor 64.

Transistor 66 is connected in a common emitter configuration and provides additional gain for preamplifier 16. The overall amplifier gain is controlled by resistor 70 in a feedback connection between the collector 72 of transistor 66 and the emitter 74 of transistor 64, operating as a voltage divider and a resistor 76 connected between emitter 74 and capacitor 78 to ground. By appropriate choice of circuit parameters, the zero frequency gain of preamplifier 16 may be maintained at substantially unity, while the AC gain, determined by resistors 70 and 76 may be varied considerably while still maintaining optimum biasing for the circuit. Capacitor 78 is a large DC blocking capacitor serving to shunt AC to ground without permitting DC gain.

Collector 72 of transistor 66 is connected through an RC coupling circuit comprising capacitor 80 and resistor 81 to the input of integrator amplifier 18. Integrator 18 comprises a high gain operational amplifier with capacitive feedback in order to effect the integration.

The circuit includes transistors 82 and 83 operating as a comparator amplifier 84. The signal input is provided at base 85 of transistor 82 while a DC reference is provided for the base of transistor 83 by a voltage divider comprising resistor 86 and the parallel combination of resistor 87 and capacitor 88.

The output of comparator amplifier 84 is fed to base 90 of transistor 92 which comprises the active portion of a high gain common emitter amplifier. A feedback capacitor 94 is connected between base 90 and collector 96 of transistor 92 in order to limit the high frequency gain of the amplifier.

Collector 96 is directly coupled to base 98 of transistor 100 which serves with transistors 102 as a complementary emitter-follower amplifier. The circuit includes a diode 104 to provide temperature compensation that closely matches the forward base-to-emitter voltage drops of transistors 100 and 102.

The impedance characteristic and the overall gain of integrator 18 is controlled by resistor 81 and a feedback circuit comprising resistors 105, 106 and 108, and capacitor 110. As may be understood, the base terminal 85 of transistor 82 serves as a summing junction for the operational amplifier, the input impedance being determined by resistor 81, and the feedback impedance by capacitor 110. Feedback resistor 108 operates to limit the low frequency gain of the amplifier while substantially 100 percent DC feedback is provided through resistors 104 and 106. Capacitor 112 serves as an AC shunt path to permit control of the integrator gain substantially on the basis of resistor 81 and capacitor 110.

The output of integrating amplifier 18 is connected through a coupling circuit comprised of resistor 114 and capacitor 116 and by lead 20 to a base terminal 118 of transistor 120 at the input of differential amplifier 22.

Differential amplifier 22 comprises a pair of three stage channels and a novel current control circuit which substantially improves the dynamic range of the amplifier. The first channel comprises input transistor 120, a voltage amplifier 122, and an emitter-follower output stage 124. The first channel receives the information input at base terminal 118 of transistor 120. Resistors 132 and 134 are selected so that a zero input at base 118 will provide a static DC output from the differential amplifier of approximately half the power supply voltage, or any other voltage suitably near the center of the linear range of operation of the transistors employed. This assures a maximum degree of symmetry between the two outputs of the differential amplifier thereby improving the linearity of the output ultimately obtained from full wave detector 32. Control of the average value of the output signal is provided by means of a novel current control circuit including transistor 136 which forms a constant current source for emitters 138 and 140 respectively of transistors 120 and 126.

Transistor 136 is connected at its base terminal 142 to a DC reference voltage divider comprising resistors 144 and 146 between the system power supply and ground. If the values of resistors 144 and 146 are properly selected, then the current through transistor 136 will limit the current in transistors 120 and 126 so that the average value of the outputs of the two channels—i.e., the DC output level when a zero input is provided at base 118—will be near the center of the range of linear operation of each channel. Thus, a given input signal will cause symmetrical excursions from the operating level at the output of both emitter-followers 124 and 130.

Collectors 148 and 150 of transistors 120 and 126 are connected to a pair of identical voltage amplifiers comprised of transistors 122 and 128. Voltage amplifiers 122 and 128 are bridged by feedback capacitors 152 and 154 respectively, which operate as Miller feedback couplers to limit the high-frequency roll-off of the amplifier stages. Collectors 156 and 158, respectively, of transistors 122 and 128 are connected to emitter-follower output stages 124 and 130, which provide for suitable coupling to the input of detector circuit 32.

A pair of feedback resistors 160 and 162 are connected to the emitter terminals of emitter-follower transistors 124 and 130 and are connected in common through lead 164 to emitter 166 of transistor 136. Feedback resistors 160 and 162 and emitter resistor 168 compare the reference voltage across resistor 146 with the amplifier output signals appearing on leads 26 and 28. As may be seen, the signal on lead 164 is the average value of the output signals appearing on leads 26 and 28, and is equal to the DC operating level when the circuit is operating correctly. Under these conditions, the base-to-emitter voltage on transistor 136 should be substantially zero, independent of the input to transistor 126.

If, however, a small deviation in the operating characteristics of one or more of the transistors causes the operating point or the average value of the two output signals to increase, there will be a corresponding increase in the signal level at emitter 166, causing transistor 136 to be driven toward cutoff.

Since transistor 136 provides the conduction path for the emitters of transistors 120 and 126, it may be seen that changes in the conduction of transistor 136 will be reflected in the collector-to-emitter current of transistors 120 and 126. For example, as transistor 136 is turned off, there is a corresponding decrease in the collector current of transistors 120 and 126 which causes a corresponding decrease in the outputs of transistors 122 and 128, tending to return the outputs of the emitter-followers 124 and 130 to the desired average value.

Similarly, a decrease in the average value of the differential amplifier outputs will cause increased conduction through transistor 136 and corresponding increases in the conduction of transistors 120 and 126. This will be reflected in changes in conduction through transistors 122 and 128 causing the outputs of transistors 124 and 130 to increase toward the desired average value.

Additional bias stabilization and improved high gain are provided by means of feedback resistor 170 connected from the emitter of transistor 130 to base 118 of transistor 120. As previously indicated, one feature of this invention is the variable sensitivity adjustment for differential amplifier 22 whereby the output represents a percentage of a predetermined critical level. To this end, there is provided the novel feedback control circuit 30. Control is provided by means of a voltage-divider network including a first section 172 of a dual potentiometer 174, and a fixed resistor 176. Arm 178 of potentiometer section 172 is connected by a feedback network including resistor 180 and DC blocking capacitor 182 to base 118 of transistor 120. As may be understood, if the open loop gain of amplifier 22 is sufficiently high, then the overall gain of the closed loop will be determined by the ratio of the feedback resistance, which depends in part on the position of arm 178 of potentiometer 172, and by the imput resistance, here determined primarily by the value of resistor 114.

Thus, it may be seen that the output signals appearing on leads 26 and 28 will be equally displaced from the DC operating level, 180 degrees out of phase, the actual level being determined by the setting of potentiometer section 172.

Referring now to FIGURE 3, the signals appearing on leads 26 and 28 provide the input to full-wave detector 32. These signals are fed through suitable coupling capacitors 184 and 186 to the base terminals 188 and 190 of transistors 192 and 194, which serve as rectifying current amplifiers. Thus, the AC input signal is converted into a corresponding time varying DC signal whose value is proportional to the integral of the output of velocity pickup 12.

Transistors 192 and 194 are DC biased by means of a pair of voltage dividers including resistor 196 and resistors 197 and 198, respectively. Emitters 202 and 204 of transistors 192 and 194, respectively, are connected through an integrating circuit comprised of resistor 206 and capacitor 208 to base 210 of transistor 212 which cooperates with direct coupled transistor 214 to form a dual stage output amplifier for detector 32.

As may be seen, transistors 192 and 194 are of the NPN type, in order to provide a positive output. Therefore, detector 32 preferably includes a dual stage output amplifier including PNP transistor 212 in order to compensate for temperature variations in the operating characteristics of transistors 192 and 194.

As previously discussed, it is often desirable that the detector circuit 32 be readily adaptable for response either to the peak value or the average or dominant mode of the monitored vibration. In the present configuration, this adaptability can be readily accomplished by appropriate adjustment of the values of resistors 206 and 216. In particular, when it is desired that detector 32 operate as a peak value, detector resistor 206 is selected to be extremely small and resistor 216 is made relatively large. Accordingly, capacitor 208 and resistor 206 serve as an integrating network with an extremely short time constant so that the voltage across capacitor 208 follows positive peak variations in the voltage appearing at the emitter terminals of transistors 192 and 194.

On the other hand, if it is desired that the detector respond only to the dominant one of a plurality of sensed vibration modes, resistor 206 is made relatively large, while resistor 216 is made fairly small. The integrating network 206–208 then has a longer time constant, whereby the voltage across capacitor 208 is a true representation of the dominant mode of vibration. Thus, while it is preferable that detector 32 normally operate as an average detector, it may easily be adapted to operate as a peak detector if desired. In fact, suitable switching means may be provided to facilitate conversion of the detector response.

As noted above, the sensitivity variation effected by feedback network 30 results in a signal appearing at the output of detector 32 representative of a percentage of the level at which an alarm is to be provided. For example, the circuitry may be arranged so that an output of ten volts from detector 32 will be sufficient to operate limit sensor 40 to initiate an alarm signal. Therefore, if an alarm is to be given when the vibration level reaches 0.03 inch, potentiometer 172 in feedback network 30 is so adjusted that an output from pickup 12 corresponding to 0.03 inch displacement will provide a detector output of ten volts. If the pickup signal corresponds to a displacement of 0.015 inch, the detector output will be equal to five volts. Thus, an immediate record of the instantaneous percentage of the critical vibration level sensed by transducer 12 may be obtained merely by connecting the detetcor output on lead 48 to a suitably calibrated meter, in which a ten-volt signal will cause a reading of 100 percent.

However, it may be seen that if the gain is adjusted to give an alarm when the displacement exceeds 0.015 inch, then a five-volt output from detector 32 will only represent displacement of 0.0075 inch. Accordingly, if an indication or record of the actual value of the vibration is desired, then it is necessary to provide a suitable calibration network 50 to scale the percentage signal, in relation to the gain of differential amplifier 22, so that a true analog of the vibration level is generated.

Thus, referring again to FIGURE 2, the percentage signal appearing on lead 34 at the output of detector circuit 32 is fed to the second section 218 of dual potentiometer 174. Potentiometer section 218 is connected between the power supply and ground by an appropriate voltage-divider network comprising resistors 220 and 224 to match the operating levels chosen for the remainder of the system. Arm 226 of potentiometer 218, which is preferably mounted on the same shaft as arm 178, is connected to an output terminal 52 to provide the calibrated analog output. Appropriate selection of potentiometer 218 and resistors 220 and 224 assures that the signal at terminal 52 is representative of the actual vibration level present in the machine.

As shown in FIGURE 3, the percentage output of detector 32, whose value will represent different vibration levels dependent on the setting of potentiometer 172, feeds transient-rejection circuit 38 comprising fixed resistor 228, variable resistor 230 and shunt capacitor 232. The output of transient-rejection circuit 38 is connected to base 234 of transistor 236. As may be understood, circuit 38 serves as a variable time constant network so that neither peak nor average value signals of extremely short duration will cause an alarm indication. When moderately long time contants are provided—i.e., by large values of variable resistor 230—it is preferable to include a shunt diode 238 to permit rapid reset of limit sensors 40 and 44 when operating in a latching mode as described below.

Limit sensor 40 comprises a differential comparator including transistors 236 and 240, with a bistable feedback network 242 comprised of transistors 244 and 246 connected between the collector terminals 248 and 250 of the comparator transistors. A fifth transistor 252 serves as a constant current source for emitters 254 and 256 of transistors 236 and 240. The vibration signal analog is provided through transient-rejection circuit 38 to transistor 236, while a fixed DC reference is provided as a second input at base terminal 258 of transistor 240 by a voltage divider comprised of resistors 260 and 262. Emitters 254 and 256 of comparator transistors 236 and 240 are connected in common to collector 264 of current-control transistor 252.

Bistable circuit 242, comprised of transistors 244 and 246, is connected between collectors 248 and 250, and serve to provide an indication by its conduction state of whether or not the reference level at base 258 is exceeded by the signal analog level at base 234.

A feedback path between constant current source 252 and the bistable circuit 242 comprised of resistors 266 and 268 assures that sufficient current will flow through transistor 252 so that only one of transistors 244 and 246 can be in its saturated condition, thereby assuring that the opposite transistor will be cut off.

Bistable circuit 242 is of known configuration, and includes feedback resistors 270 and 272 which provide regeneration and establish a signal level which must be overcome in order for the conductivity state of circuit 242 to be reversed.

For the configuration of FIGURE 3, a positive difference between the signal at base 234 and that at base 258 is indicative that the critical level has been exceeded. Conversely, a negative difference represents a non-alarm condition. Assuming that the switch shown in FIGURE 3 and denoted at 274 is kept open, proper selection of circuit parameters will assure that a positive difference reflected at collector 248, will cause transistor 244 to conduct and transistor 284 to cutoff; while a negative difference, reflected at collector 250, will cause the conductivities of transistors to be reversed.

In the above mode of operation, it may be seen that the bistable circuit 242 follows the signal appearing at base terminal 234 as it crosses the alarm-indication level. However, if it is desired that a continuous indication be given once the alarm-indication level is exceeded, a feedback path 276 comprised of a diode 278 and switch 274 is connected between collector 280 of transistor 244 and base 234 of transistor 236. Thus, when transistor 244 is conducting, the feedback to the base 234 of transistor 236 assures that the signal at collector 248 remains at a level sufficient to keep transistor 244 conducting, independent of the signal at base 234. In other words, after the preset vibration level is exceeded, an output is continuously provided from transistor 244 to energize utilization device 42 irrespective of further variation in the vibration level. To clear the alarm signal, switch 274 is momentarily opened, permitting the conductivity of transistors 244 and 246 to be reversed, thereby returning transistor 244 to its original state.

As previously mentioned, it is desirable in many instances to provide an output indication whenever the vibration level falls below a particular level, as an indication of other machine malfunctions. To this end, there is provided the second channel denoted by primed numerals in FIGURE 1. As noted each of the circuits denoted by a primed numeral is of the same design as the element having the corresponding unprimed numeral. Lower limit sensor 44, however, differs from upper limit sensor 40 in the manner shown in FIGURE 4.

As in the case of upper limit sensor 40, in FIGURE 4 a reference signal is provided at base 258' of input transistor 240', and serves to establish the limit at which a bistable circuit 242' will reverse its state of conduction. However, in the case of lower limit sensor 44, the condition of interest is opposite to that of limit sensor 40, i.e., the normal state of operation will correspond to transistor 244' conducting and transistor 246' in its cutoff condition. Transistor 246' will assume its conducting state when the vibration level falls below the preset amount established at base 258'. Thus, the output to utilization device 42' is provided from collector 284' of transistor 246' rather than from collector 280' of transistor 244'.

In order to provide the latching function previously described in connection with limit sensor 40, it should be noted that it is desired to latch the operation of transistor 246' rather than that of transistor 244'. Accordingly, feedback path 276' is connected between collector 284' of transistor 246' and base 258' of transistor 240' rather than between base 234' of transistor 236' and collector 280' of transistor 248', as in FIGURE 3. In this way, as long as the limit provided at base 258' is exceeded (corresponding to the desired state of operation), transistor 244' will conduct. If the signal level at base 234' falls below that at base 258', bistable circuit 242' will reverse its conduction, and feedback path 276' will latch transistor 246' in its conducting state, until released by momentary operation of switch 274'.

Thus, there has been described above a vibration monitoring system which satisfies the most demanding requirements for accuracy and flexibility, while at the same time providing simplicity and ease of operation which permits convenient and accurate use by both skilled and nonskilled personnel.

The invention may be embodied in other specific forms without departing from the spirit or essential characteristics thereof.

What is claimed and desired to be secured by United States Letters Patent is:

1. A vibration monitor comprising: a transducer responsive to a source of vibration; an amplifier; input circuitry connecting the amplifier to the transducer; said amplifier comprising first and second channels, each having an input and an output, the input of said first channel being connected to said input circuitry, and the input of said second channel being connected to a first constant signal source, means providing a common current path for said channels whereby said channels operate as a differential amplifier, current control means for said current path, means for adjusting said control means, said adjusting means including first means to provide a signal to said current means representative of the D.C. operating level of the outputs of said first and second channels, and means for providing a second constant signal to said current control means representative of the desired average DC operating level, and bearing a predetermined relation to said first reference signal, said current control means being operative to vary the current flow in said common current path in relation to the difference between said DC operating level signal and second constant signal; a gain control network for said amplifier; means connected to the amplifier channel outputs to provide an indication when said outputs exceed a fixed reference level, the measured vibration necessary to provide amplifier outputs exceeding said reference level being controlled by the amplifier gain control network.

2. A vibration monitor as defined in claim 1 wherein said gain control network comprises feedback impedance means connected between the input and output of one of said amplifier channels; and means for adjusting the value of said feedback impedance means.

3. A vibration monitor as defined in claim 2 wherein said means connected to said amplifier outputs includes limit sensing means connected to said amplifier channel outputs, a third constant signal source also connected to said limit sensing means to establish said fixed reference level; calibrating means connected to said amplifier to convert the output thereof into a signal representing the amplitude of the measured vibration, said calibrating means including a variable scaling resistor, and means mechanically coupling said scaling resistor, and said feedback impedance adjusting means for synchronous operation, and display means coupled to said scaling resistor to provide a display of said vibration amplitude signal.

4. A vibration monitor as defined in claim 3 wherein said mechanical coupling means, said scaling resistor and said gain control impedance adjusting means increase the attenuation of the amplifier output when the amplifier gain is increased, and decrease the attenuation of the amplifier output signal when said amplifier gain is decreased.

5. A vibration monitor comprising: a transducer responsive to a source of vibration; an amplifier; input circuitry connecting the amplifier to the transducer; gain control means for the amplifier comprising an impedance and manual means for adjusting the value of said impedance; limit sensing means connected to the amplifier output to provide an indication when said output exceeds a fixed reference level, the level of vibration necessary to produce said indication being controlled by the amplifier gain control means, first output means coupled to said amplifier to provide an indication of the percentage relationship between the amplifier output and the fixed reference level; and second output means coupled to said amplifier to provide an indication of the actual value of the vibration being measured, said second output means including a calibration circuit comprising a variable scaling resistor, and means mechanically coupling said gain control impedance adjusting means to said scaling resistor for synchronously adjusting the values thereof.

6. A vibration monitor as defined in claim 5 wherein said mechanical coupling means, said scaling resistor and said gain control impedance adjusting means increase the attenuation of the amplifier output when the amplifier gain is increased, and decrease the attenuation of the amplifier output signal when said amplifier gain is decreased.

7. A vibration monitor as defined in claim 5 wherein said impedance network comprises a feedback circuit connected between the input and output of the amplifier.

References Cited

UNITED STATES PATENTS

| | | | |
|---|---|---|---|
| 2,309,560 | 1/1943 | Welty | 73—71.2 XR |
| 3,089,332 | 5/1963 | Comstock | 73—71.4 |
| 3,195,034 | 7/1965 | Bensema | 73—71.4 XR |
| 3,201,776 | 8/1965 | Morrow et al. | 73—71.4 XR |

RICHARD C. QUEISSER, Primary Examiner

JOHN P. BEAUCHAMP, Assistant Examiner

U.S. Cl. X.R.

73—71.2, 517; 340—261, 262

UNITED STATES PATENT OFFICE
CERTIFICATE OF CORRECTION

Patent No. 3,455,149                        July 15, 1969

George B. Foster et al.

It is certified that error appears in the above identified patent and that said Letters Patent are hereby corrected as shown below:

Column 3, line 33, after "detector" insert -- output --.
Column 4, line 19, after "detector" insert -- circuit --.
Column 5, line 26, "output." should read -- output, --.

Signed and sealed this 12th day of May 1970.

(SEAL)
Attest:

Edward M. Fletcher, Jr.                     WILLIAM E. SCHUYLER, JR.
Attesting Officer                              Commissioner of Patents